(12) United States Patent
Chang et al.

(10) Patent No.: US 7,345,793 B2
(45) Date of Patent: Mar. 18, 2008

(54) SCAN METHOD

(75) Inventors: Chin-Lin Chang, Hsinchu (TW); Chen-Ho Lee, HsinChu (TW)

(73) Assignee: Transpacific IP Limited, Taipei (TW)

( * ) Notice: Subject to any disclaimer, the term of this patent is extended or adjusted under 35 U.S.C. 154(b) by 1030 days.

(21) Appl. No.: 10/108,354

(22) Filed: Mar. 29, 2002

(65) Prior Publication Data
US 2003/0025953 A1    Feb. 6, 2003

(30) Foreign Application Priority Data
Aug. 3, 2001    (TW) ............................... 90119093 A

(51) Int. Cl.
*H04N 1/04* (2006.01)
(52) U.S. Cl. .................. 358/474; 358/1.2; 358/504; 358/514; 358/515; 382/169; 382/274
(58) Field of Classification Search ............... 358/474, 358/1.2, 1.5, 3.26, 496, 497, 504, 512, 514, 358/515, 518, 475, 425; 250/208.1; 382/169, 382/199, 274, 286
See application file for complete search history.

(56) References Cited

U.S. PATENT DOCUMENTS

| | | | | |
|---|---|---|---|---|
| 3,679,814 A | * | 7/1972 | Barclay ...................... 348/617 |
| 4,017,892 A | * | 4/1977 | Takahara et al. ................ 386/3 |
| 5,289,292 A | * | 2/1994 | Osada et al. ................. 358/451 |
| 5,666,156 A | * | 9/1997 | Spears et al. ............... 348/103 |
| 5,859,712 A | * | 1/1999 | Kim ........................... 358/504 |
| 6,075,236 A | * | 6/2000 | Lamproye et al. ........ 250/208.1 |
| 6,100,928 A | * | 8/2000 | Hata ........................ 348/229.1 |
| 6,185,053 B1 | * | 2/2001 | Tsai ........................... 359/823 |
| 6,252,998 B1 | * | 6/2001 | Tsai ........................... 382/298 |
| 6,278,101 B1 | * | 8/2001 | Puyot ...................... 250/208.1 |

* cited by examiner

*Primary Examiner*—Aung S. Moe
*Assistant Examiner*—Negussie Worku
(74) *Attorney, Agent, or Firm*—Stolowitz Ford Cowger LLP

(57) ABSTRACT

A scan method comprising a sensing photo module applicable in a scan apparatus for scanning a document is disclosed. The sensing photo module is equipped with photo sensors parallel to each other and detects the photo signal at every collection distance. The photo sensors extend horizontally and are positioned a line distance between the adjacent photo sensors. Under low operating resolution, the vertical resolution is increased by making the line ratio an integer, in order to solve the problem of color-quality loss due to a non-integer line ratio.

28 Claims, 6 Drawing Sheets

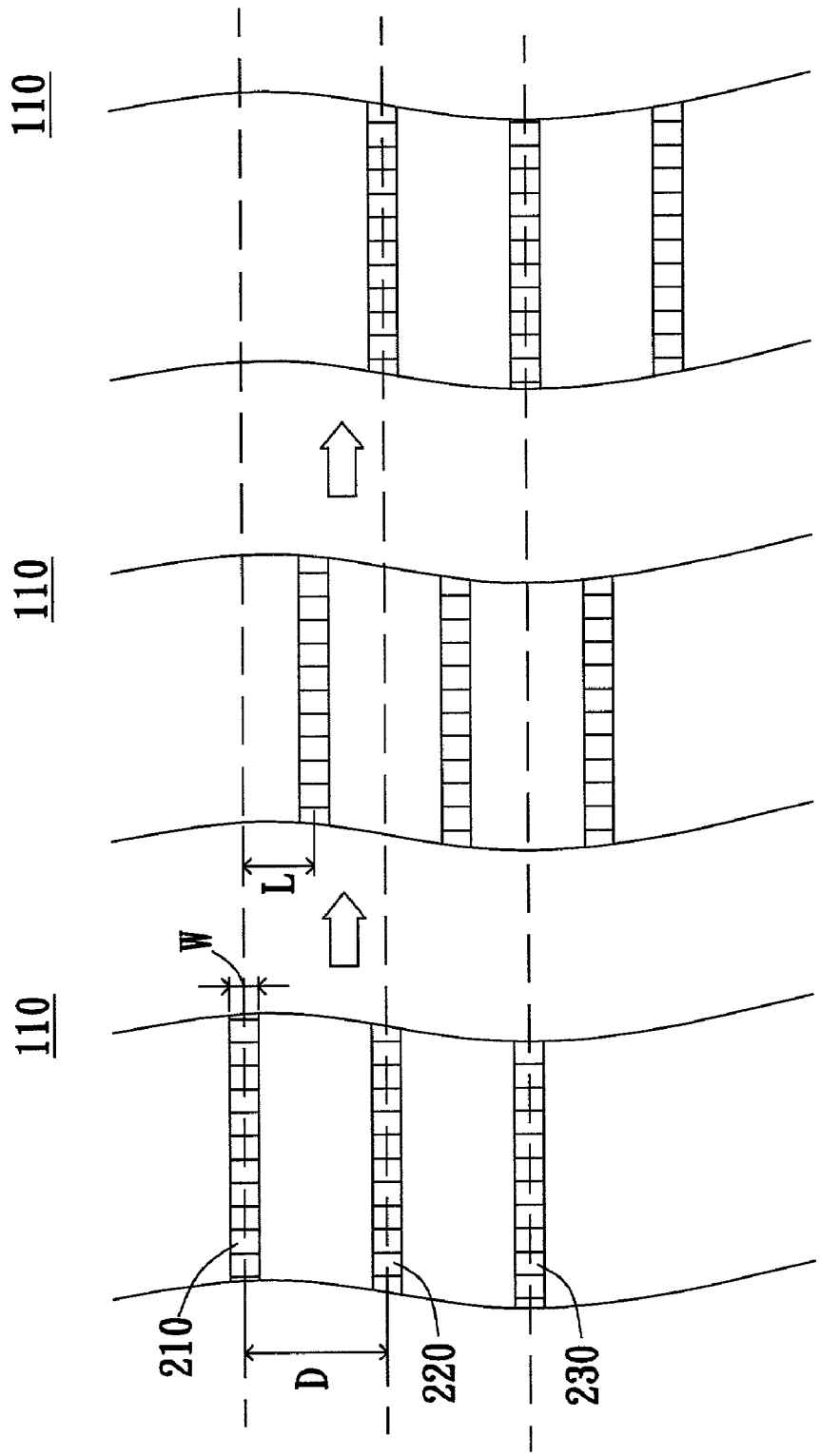

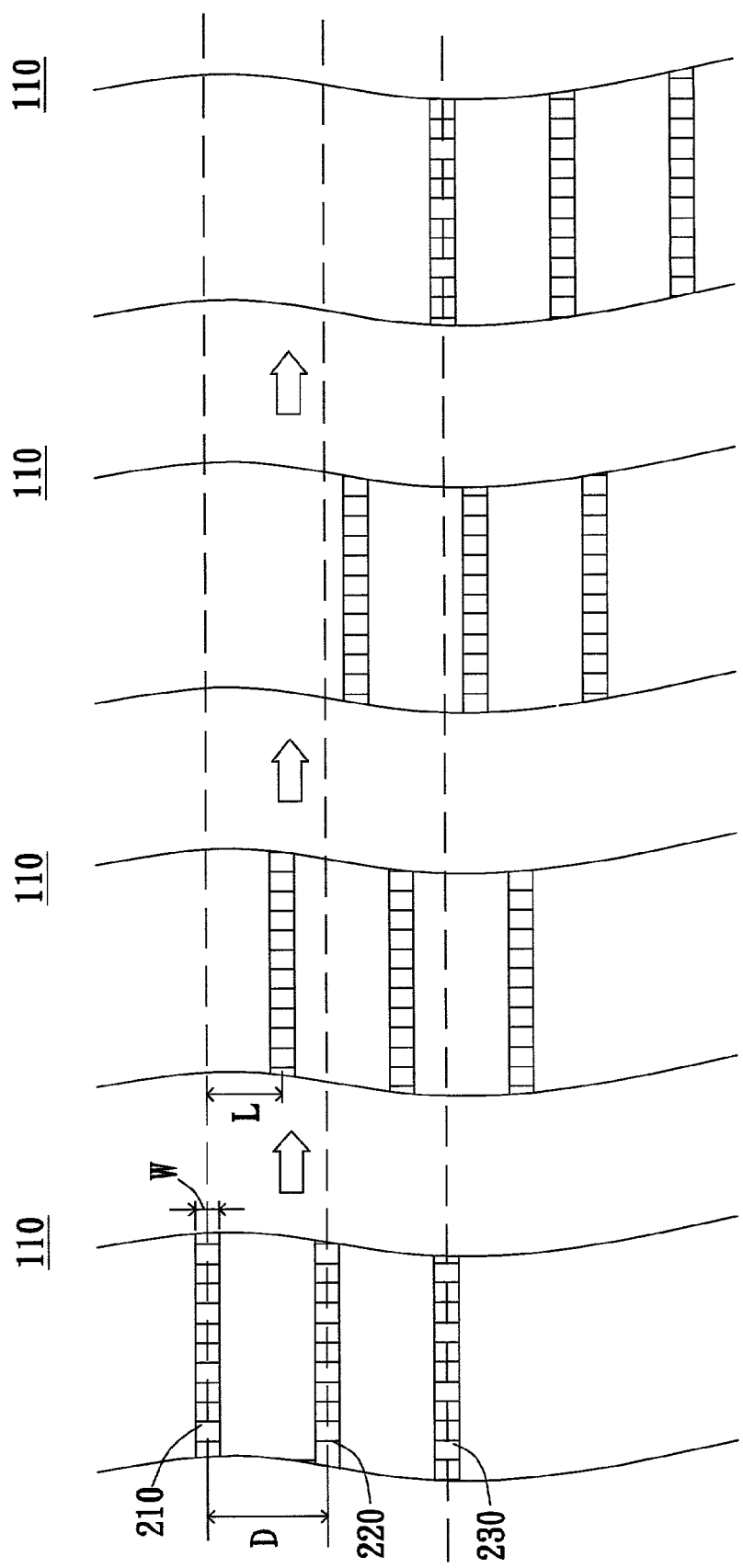

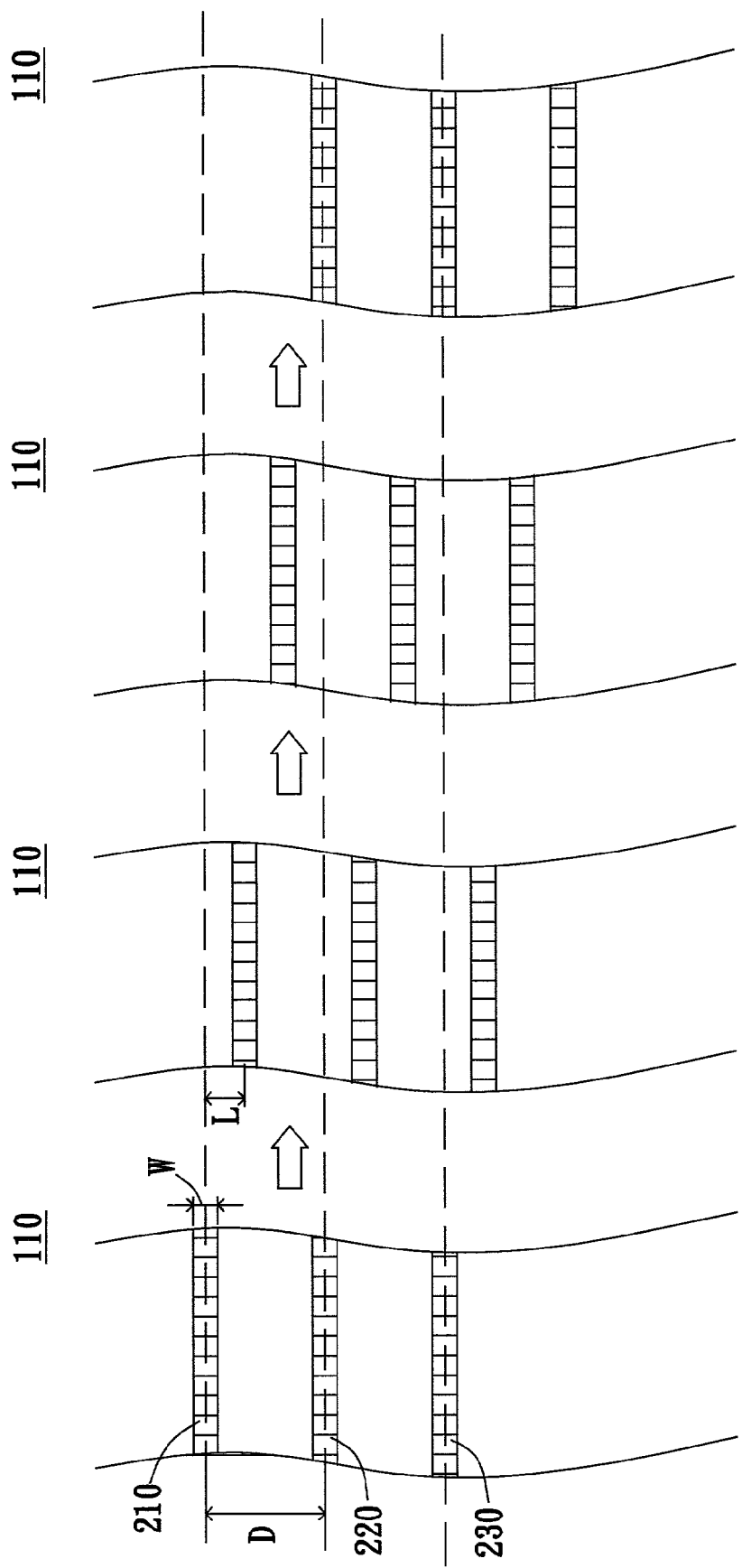

SCAN METHOD

This application incorporates by reference Taiwanese application Serial No. 90119093, filed Aug. 3, 2001.

BACKGROUND OF THE INVENTION

1. Field of the Invention

This invention relates to a method for improving the problem of color-quality loss of a scan apparatus, particularly, to a method for improving the loss of color-quality by adjusting the vertical resolution under low operating resolution.

2. Description of the Related Art

In its early days, the computer was limited to processing objects that did not require high speed, for instance, document processing. As the computer technology advances, the personal computer has been used to calculate data of larger quantity, for example, audio and image data. Because a scanner has the capability of transferring the information on a document to a computer-readable digital data, it has become an important tool in the multi-media era. Generally, the user wants a scanner capable of high-speed scanning and high-quality imaging. Many scanners do offer high-speed scanning process, however, at the lost of image quality.

Please refer to FIG. 1A for the following description of a scanner according to a conventional method. FIG. 1A shows the top view of a scan apparatus 100 and a photo assembly 101 installed in the scan apparatus 100. A document 102 is placed on the platform of the scan apparatus 100. During the scanning process, the photo assembly 101 will be driven by a motor (not shown) and move vertically in the direction V. Next, FIG. 1B shows the cross-sectional view of the scan apparatus 100 of FIG. 1A. The photo assembly 101 comprises a sensing photo module 110, a lens module 104, and a light source 103. When the document 102 is radiated by light emitted from the light source 103, the light is reflected. The reflected light passes through the lens module 104 and focuses at the sensing photo module 110. Then, the photo assembly 101 gradually moves from one end to the other end of the document 102 and the image data of the document 102 is obtained by extracting the photo signal of the sensing photo module 110.

Referring to FIG. 2A, it shows the structure of the sensing photo module 110. The sensing photo module 110 comprises several photo sensors parallel to each other, for instance, a red photo sensor 210, a green photo sensor 220, and a blue photo sensor 230. The optical sensing width for each photo sensor is W and the line distance between the adjacent photo sensors is D. The photo sensors 210, 220, 230 are composed of CCDs (charge-coupled devices) or CMOS sensors for receiving the light signal reflected from the document 102. The optical resolution of the scan apparatus 100, which is also the resolution of the scan apparatus 100 by the horizontal direction, is given by the density of the CCD, whereas the resolution of the scan apparatus 100 by the vertical direction is determined by the velocity of the moving photo assembly 101 and the frequency at which the sensing photo module 110 collects data. Higher velocity of the photo assembly 101 and lower frequency of data collecting for the sensing photo module 110 result in lower resolution along the vertical direction.

The unit of resolution is dpi (dots per inch), which means the number of dots in one inch; more dots in one inch represents higher resolution. Next, FIG. 2B, it shows the positions of the sensing photo assembly 110 for two adjacent data-collecting operations. The data-collecting position of sensing photo assembly 110, represented by the solid line, is processed before the collecting data position of the sensing photo assembly 110, represented by the dotted line. During these two data-collecting operations, the collection distance that the sensing photo module 110 shifts is L. The shorter collection distance L, the higher is the resolution along the vertical direction. The line ratio is defined as the ratio of line distance D to collection distance L. Therefore, if the line distance D remains constant, higher resolution along the vertical direction can be achieved by decreasing the collection distance L, thus increasing the line ratio.

Please refer FIGS. 3A, 3B, and 3C. They show the moving condition of the sensing photo module 110 relative to the document 102. A red photo sensor 210, a green photo sensor 220, and a blue photo sensor 230, parallel to each other, are equipped in the sensing photo module 110. If the resolution of the sensing photo module 110 is 100 dpi, which is lower than the optical resolution of 300 dpi, for example, then the collection distance L can be selected as 24 µm, and the line distance D can be selected as 48 µm.

The position where the sensing photo module 110 first receives the photo signal is shown in FIG. 3A. As it shifts downward with a collection distance L (24 µm) in the vertical direction, the sensing photo module 110 detects a second photo signal, for which the position is shown in FIG. 3B. FIG. 3C shows the position at which the sensing photo module 110 moves downward for another collection distance L and receives the photo signal for the third time. The sensing photo module 110 will not stop until the entire document 102 is scanned. The line ratio of this example is 2, and the position of the document 102 detected by the blue photo sensor 230 in FIG. 3A is the same as that detected by the green photo sensor 220 in FIG. 3C. For a period of time, the red photo sensor 210 will detect the photo signal at the same position of the document 102. Therefore, after the scanning is completed, one position of the document 102 will have been detected by the red photo sensor 210, green photo sensor 220, and blue photo sensor 230, respectively. The digital data of the image is recovered by processing the red, green, and blue photo signals.

However, in the case of low resolution due to long collection distance L, a 110 certain position of the document 102 will not be detected by all of the red, green, and blue photo sensors because the line ratio number is not an integer. Accordingly, the red, green, and blue images do not overlap and the image loses its quality.

SUMMARY OF THE INVENTION

The object of the present invention therefore is to provide a scan method to improve the problem of loss of color-quality due to the non-integer line ratio. The scan method of the present invention is applicable in a scan apparatus for scanning a document. The scan apparatus comprises a sensing photo module that scans the document vertically with an operating resolution. The sensing photo module detects the photo signal once at every collection distance. The sensing photo module comprises photo sensors parallel to each other. The first photo sensor and the second photo sensor extend horizontally and are positioned a line distance between each other.

The ratio of the line distance to the collection distance is defined as a line ratio.

The steps of the disclosed scan method are described as follow. Firstly, an adjusting multiplier is determined such that the multiplication between the line ratio and the adjusting multiplier is a natural value. Next, a vertical resolution is determined by multiplying the operating resolution and the adjusting multiplier. Then, the document is scanned to obtain an image data according to the vertical resolution and the horizontal resolution of the operation resolution. Finally, a resolution for transferring the image is adjusted to the operating resolution.

BRIEF DESCRIPTION OF THE DRAWINGS

The above objects and other advantages of the present invention will become more apparent from a detailed description of the preferred embodiments of the present invention, with reference to the attached drawings in which:

FIG. 3A shows the position where the sensing photo module first detects the photo signal according to a conventional invention;

FIG. 3B shows the position where the sensing photo module detects the photo signal for the second time according to a conventional invention;

FIG. 3C shows the position where the sensing photo module detects the photo signal for the third time according to a conventional invention;

FIG. 4A shows the position where the sensing photo module first detects the photo signal according to the present invention without adjusting the vertical resolution;

FIG. 4B shows the position where the sensing photo module detects the photo signal for the second time according to the present invention without adjusting the vertical resolution;

FIG. 4C shows the position where the sensing photo module detects the photo signal for the third time according to the present invention without adjusting the vertical resolution;

FIG. 4D shows the position where the sensing photo module detects the photo signal for the fourth time according to the present invention without adjusting the vertical resolution;

FIG. 5A shows the position where the sensing photo module first receives the photo signal according to the present invention after adjusting the vertical resolution;

FIG. 5B shows the position where the sensing photo module detects the photo signal for the second time according to the present invention after adjusting the vertical resolution;

FIG. 5C shows the position where the sensing photo module detects the photo signal for the third time according to the present invention after adjusting the vertical resolution;

FIG. 5D shows the position where the sensing photo module detects the photo signal for the fourth time according to the present invention after adjusting the vertical resolution.

DESCRIPTION OF THE PREFERRED EMBODIMENTS

Figure 1A:
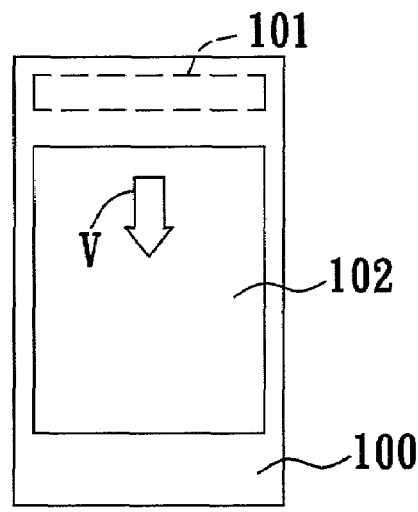
FIG. 1A shows the top view of the scan apparatus according to a conventional method.
Figure 1B:
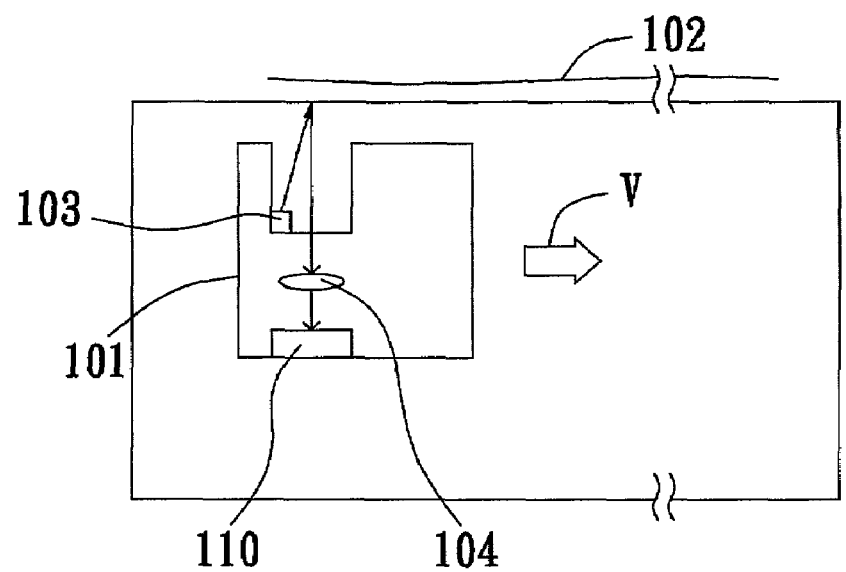
FIG. 1B shows the cross-sectional view of the scan apparatus according to a conventional method.
Figure 2A:
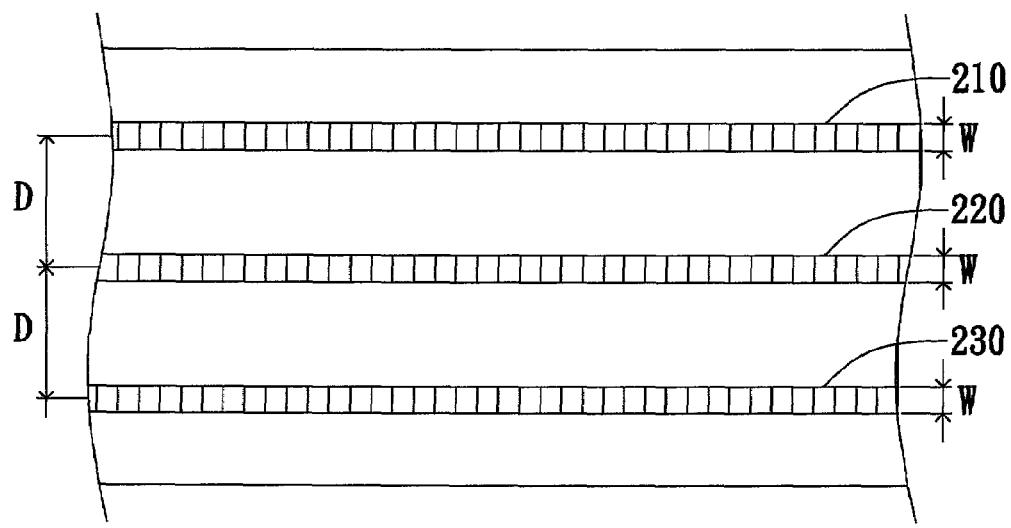
FIG. 2A shows the structure of the sensing photo module.
Figure 2B:
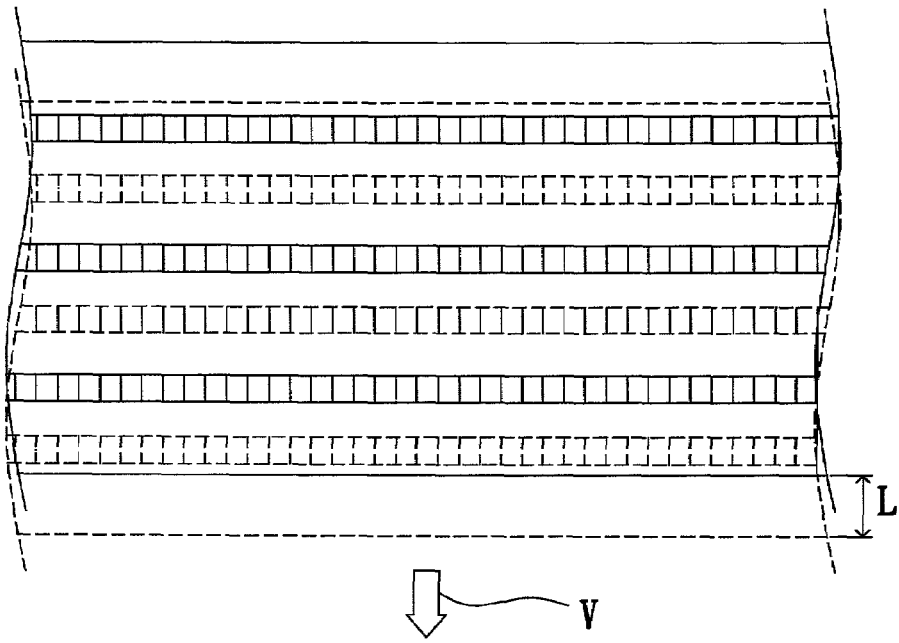
FIG. 2B shows the positions of the sensing photo assembly for two consecutive data-collecting operations.

Referring to FIGS. 4A through 4D, they show the relative movement of the sensing photo module 110 without adjusting the vertical resolution, according to a preferred embodiment of the present invention. The scan apparatus 100 comprises a red photo sensor 210, green photo sensor 220, and blue photo sensor 230, which are parallel to each other. As an example, the optical resolution of the sensing photo module 110 is 300 dpi, the optical sensing width W is 8 µm, and the line distance D for the adjacent photo sensors is 48 µm. If the scan apparatus 100 operates with the operating resolution of 75 dpi and the collection distance L will be 8 µm*4=32 µm, wherein 4 is given by 300 dpi/75 dpi. Hence, the line ratio has a non-integer value of 1.5, which is the ratio value of line distance D to the collection distance L.

The position at which the sensing photo module 110 first receives the photo signal is shown in FIG. 4A. As it shifts downward with a collection distance L, 32 µm, in the vertical direction, the sensing photo module 110 detects the photo signal a second time, for which the position is shown in FIG. 4B. FIG. 4C shows the position where sensing photo module 110 moves downward with another collection distance L (for a total of 64 µm) and receives the photo signal a third time. Finally, the sensing photo module 110 detects the photo signal a fourth time after moving downward another collection distance L—(for a total of 96 µm), for which the position of the sensing photo module 110 is shown in FIG. 4D. The sensing photo module 110 will continue until the entire document 102 is scanned.

Please note that the position of the document 102 detected by the blue photo sensor 230 in FIG. 4A is the same as that detected by the red photo sensor 210 in FIG. 4D. However, the position of the document 102 detected by the blue photo sensor 230 in FIG. 4A is not aligned with the position of the document 102 detected by the green photo sensor 220 in FIG. 4B or FIG. 4C, since the line ratio of 1.5 for this example is not an integer. Therefore, one specific position of the document 102 will not be detected by all three color sensors 210, 220, and 230. Accordingly, the scanned image loses its color quality.

The scan method of the invention for improving image quality is the described as follow. First, an adjusting multiplier is determined according to the line ratio, wherein multiplication of the adjusting multiplier and the line ratio satisfies a natural number. In this embodiment, the adjusting multiplier can be selected as 2, for which multiplication of 2 and 1.5 results in a natural number of 3. Then, the vertical resolution of 150 dpi is given by multiplying the operating resolution of 75 dpi by the adjusting multiplier of 2. The horizontal resolution is selected as the operating resolution—75 dpi, which is also the resolution for transferring the image data.

Please refer to FIGS. 5A through 5D. They show the relative movement of the sensing photo module 110 corresponding to FIGS. 4A through 4D, respectively, after adjusting the vertical resolution. After the adjustment is made, the position of the document 102 at which the blue photo sensor 230 receives the photo signal in FIG. 5A is also detected by the green photo sensor 220 in FIG. 5D. If the sensing photo module 110 moves downward continuously, the same position of the document 102 will also be detected by the red photo sensor 210. Therefore, one specific position of the document 102 is detected by all three photo sensors 210, 220, and 230. Accordingly, the scanned image maintains its color quality.

Figure 6:
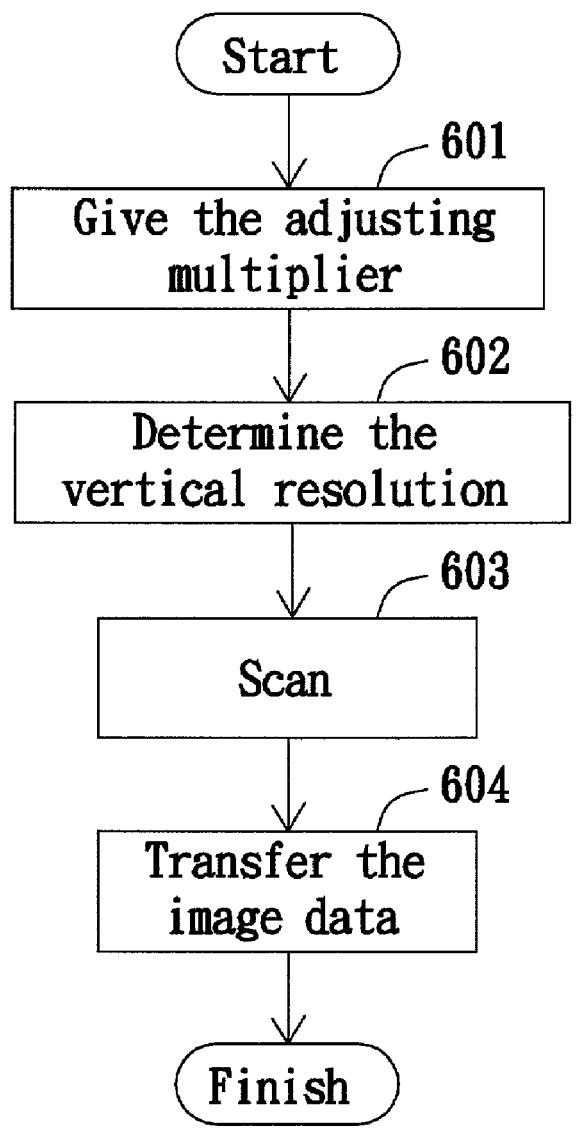
FIG. 6 shows the flow chart of implementing the method of the present invention.

In FIG. 6, the flow chart shows the method implemented according to the present invention. For step 601, the adjusting multiplier Q is given such that the result satisfies the natural value of (N/P)*Q given that the optical resolution of the sensing photo module 110 is M dpi, line ratio is N, the operating resolution is M/P, and the generated line ratio N/P is not a natural value, wherein the M, N, P and Q are all natural values and Q is $1<Q \leq P$. Next, in step 602, the vertical resolution is determined as (M/P)*Q. Then, in step 603 the scan operation is processed by selecting the vertical resolution of (M/P)*Q and the horizontal resolution of operating resolution M/P. Finally, in step 604 the image data is transferred with the resolution of M/P.

The embodiment described above is applicable in the scan apparatus for scanning documents. The scan method in the present invention does not equip complex hardware design, but just to simply revise the software. The method disclosed herein provides a low-cost solution to the problem of color-quality loss due to the non-integer line ratio.

Once given the above disclosure, many other features, modifications, and improvements will become apparent to the skilled artisan. Such other features, modifications, and improvements are considered to be a part of this invention, and therefore the scope of the following claims should be should be accorded the broadest interpretation.

What is claimed is:

1. A method comprising:
   determining an adjusting multiplier for a scanning device having an operating resolution, the adjusting multiplier determined based at least in part on a ratio of the line distance between a first and a second photo sensor of the scanning device and a collection distance of the scanning device; and
   determining a vertical resolution based at least in part on multiplication of the operating resolution of the scanning device and the determined adjusting multiplier.

2. The method of claim 1, wherein said first photo sensor comprises a red photo sensor and said second photo sensor comprises a green photo sensor.

3. The method of claim 1, wherein said first photo sensor comprises a green photo sensor and said second photo sensor comprises a blue photo sensor.

4. The method of claim 1, wherein said first and second photo sensors comprise charged-coupled devices (CCD).

5. The method of claim 1, wherein the line distance between the first and the second photo sensor of the scanning device comprises a line ratio, and said line ratio is substantially proportional to said operating resolution.

6. The method of claim 1, wherein said adjusting multiplier is greater than or equal to one.

7. A scanning apparatus, comprising:
   a housing;
   a document window disposed on the housing; and
   a sensing photo module disposed in the housing, comprising an array of photo sensors separated by a distance, wherein the array of photo sensors comprise a plurality of lines of photo sensors and wherein a first and a second photo sensor of the array are disposed on different lines, wherein the sensing photo module is adapted to be moved from a first location to at least a second location with respect to the document window;
   wherein the scanning apparatus is configured to:
   adjust a vertical resolution of the scanning apparatus based at least in part on an adjusting multiplier, wherein the adjusting multiplier is based at least in pan on a ratio of the line distance between the first and the second photo sensor of the scanning apparatus and a collection distance of the scanning apparatus; and
   initiate a scanning operation utilizing a horizontal resolution and the adjusted vertical resolution.

8. The scanning apparatus of claim 7, wherein the scanning apparatus further includes an operating resolution at least generally equal to the vertical resolution.

9. The scanning apparatus of claim 8, wherein the horizontal resolution is substantially equal to said operating resolution.

10. The scanning apparatus of claim 7, wherein the scanning operation is initiated in response to manual selection by a user.

11. The scanning apparatus of claim 7, wherein the vertical resolution is adjusted to result in a position on a document being scanned by at least two of the array of photo sensors.

12. The scanning apparatus of claim 7, wherein the line ratio comprises the line distance between the first and the second photo sensor of the scanning apparatus.

13. The scanning apparatus of claim 7, wherein said array of photo sensors comprises an array of Complementary Metal-Oxide Semiconductor (CMOS) photo sensors.

14. The scanning apparatus of claim 7, wherein the adjusting multiplier is determined such that the product of the adjusting multiplier and the line ratio comprises a whole number.

15. The scanning apparatus of claim 7, wherein adjusting the vertical resolution of the scanning apparatus based at least in part on the adjusting multiplier comprises multiplying the vertical resolution by the adjusting multiplier.

16. The scanning apparatus of claim 7, wherein at least one of said photo sensors comprises a red photo sensor and at least one of said photo sensors comprises a green photo sensor.

17. The scanning apparatus of claim 7, wherein at least one of said photo sensors comprises a green photo sensor and at least one of said photo sensors comprises a blue photo sensor.

18. The scanning apparatus of claim 7, wherein said array of photo sensors comprise a charged-coupled device (CCD).

19. The method of claim 1, further comprising scanning a document to obtain image data substantially in accordance with said vertical resolution and a horizontal resolution, wherein the horizontal resolution is substantially equal to said operating resolution.

20. A system, comprising:
   means for scanning a document, said means for scanning including a movable photo sensor module that contains lines of photo sensors;
   means for identifying a calibration value that, when multiplied by a quotient of a first distance between the lines and a second collection distance associated with movement of the movable photo sensor module, produces an integer value; and
   means for setting a vertical resolution for the scanning according to a product of the calibration value and an operating resolution associated with the scanning when the quotient is not a whole number.

21. The system of claim 20, wherein the calibration value is greater than one.

22. The system of claim 20, wherein the scanning is completed using the set vertical resolution.

23. The system of claim 20, wherein the lines of photo sensors includes a line of red photo sensors, a line of green photo sensors and a line of blue photo sensors.

24. The system of claim 20, wherein a horizontal resolution for the scanning is set to the operating resolution.

25. The system of claim 20, wherein the quotient is a line ratio.

26. The system of claim 25, wherein the line ratio is a non-integer value that, when multiplied by the calibration value, produces the integer value.

27. The system of claim 20, further comprising means for setting the vertical resolution without using the calibration value when the quotient is the whole number.

28. The system of claim 20, wherein, when the quotient is the whole number, the vertical resolution is set according to a velocity of the movable photo sensor module during scanning and a frequency of data collection of the movable photo sensor module during scanning, and without using the calibration value.

* * * * *

UNITED STATES PATENT AND TRADEMARK OFFICE
CERTIFICATE OF CORRECTION

PATENT NO. : 7,345,793 B2 Page 1 of 1
APPLICATION NO. : 10/108354
DATED : March 18, 2008
INVENTOR(S) : Chang et al.

It is certified that error appears in the above-identified patent and that said Letters Patent is hereby corrected as shown below:

At column 5, line 62, please replace "least in pan on a" with --least in part on a--.

Signed and Sealed this

Eleventh Day of August, 2009

David J. Kappos
*Director of the United States Patent and Trademark Office*